United States Patent
Mori et al.

(10) Patent No.: US 7,944,175 B2
(45) Date of Patent: May 17, 2011

(54) BATTERY CHARGING SYSTEMS

(75) Inventors: Tatsuki Mori, Anjo (JP); Toshiyasu Kasuya, Anjo (JP); Kazuyuki Sakakibara, Anjo (JP)

(73) Assignee: Makita Corporation, Anjo (JP)

( * ) Notice: Subject to any disclaimer, the term of this patent is extended or adjusted under 35 U.S.C. 154(b) by 502 days.

(21) Appl. No.: 11/790,228

(22) Filed: Apr. 24, 2007

(65) Prior Publication Data

US 2007/0252553 A1 Nov. 1, 2007

(30) Foreign Application Priority Data

Apr. 26, 2006 (JP) ................................ 2006-121964

(51) Int. Cl.
*H02J 7/00* (2006.01)
(52) U.S. Cl. ........................................ 320/113; 320/112
(58) Field of Classification Search .................. 320/112, 320/113
See application file for complete search history.

(56) References Cited

U.S. PATENT DOCUMENTS

| | | | |
|---|---|---|---|
| 5,343,135 A | | 8/1994 | Mathieson |
| 5,767,778 A | | 6/1998 | Stone et al. |
| 6,184,653 B1 | * | 2/2001 | Wu ................................ 320/110 |
| 6,218,812 B1 | * | 4/2001 | Hanson .......................... 320/161 |
| 6,275,009 B1 | | 8/2001 | Sakakibara et al. |
| 6,344,733 B1 | | 2/2002 | Crass et al. |
| 6,429,625 B1 | | 8/2002 | LeFevre et al. |
| 6,462,513 B1 | * | 10/2002 | Bradus et al. .................. 320/125 |
| 6,556,665 B1 | | 4/2003 | Suzuki et al. |
| 6,643,786 B1 | * | 11/2003 | Kawakami ..................... 713/340 |
| 7,003,329 B1 | | 2/2006 | Kirkpatrick |
| 2001/0021663 A1 | * | 9/2001 | Sawada et al. ................. 455/572 |
| 2004/0140904 A1 | | 7/2004 | Bertness |
| 2005/0009577 A1 | | 1/2005 | Kangas et al. |
| 2005/0206346 A1 | | 9/2005 | Smith et al. |

FOREIGN PATENT DOCUMENTS

| | | |
|---|---|---|
| EP | 1 130 661 A1 | 9/2001 |
| JP | 9-172742 | 6/1997 |
| JP | A-09-172742 | 6/1997 |
| JP | A-2000-295782 | 10/2000 |
| JP | A-2002-118627 | 4/2002 |
| JP | A-2005-295751 | 10/2005 |

OTHER PUBLICATIONS

Japanese Patent Office communication, mailed Nov. 4, 2009 in Japanese Patent Application No. 2006-121964.

* cited by examiner

*Primary Examiner* — Edward Tso
*Assistant Examiner* — Johali A Torres Ruiz
(74) *Attorney, Agent, or Firm* — Oliff & Berridge, PLC

(57) ABSTRACT

A system for charging a power tool battery includes a charging device capable of charging a battery, a memory device capable of storing data of a plurality of sound patterns, a selecting device capable of selecting a sound pattern data from the plurality of sound patterns, and a sound generating device capable of generating a sound based on the selected sound pattern data when the charging operation of the battery by the charging device has been completed.

16 Claims, 6 Drawing Sheets

BATTERY CHARGING SYSTEMS

This application claims priority to Japanese patent application serial number 200-121964, the contents of which are incorporated herein by reference.

BACKGROUND OF THE INVENTION

1. Field of the Invention

The present invention relates to battery charging systems for charging batteries, such as batteries of power tools.

2. Description of the Related Art

Japanese Laid-Open Patent Publication No. 9-172742 teaches a known charging system for charging a battery of a power tool. The charging system includes a sound generator that can generate a sound when the charging operation has been completed. Therefore, an operator can recognize the completion of the charging operation by the sound even if he or she is working at a place away from the charging system.

However, when a plurality of charging systems that are of a same or similar type are used in the same working cite, it is difficult to recognize which sound originates from which charging system when the charging operation has been completed.

Thus, there is a need in the art for a charging system that can provide identification of the charging system.

SUMMARY OF THE INVENTION

One aspect according to the present invention includes a system for charging a battery of a power tool. The system includes a battery side connector and a charger side connector electrically connectable to each other, a charging device capable of charging the battery when the battery side connector and the charger side connector are electrically connected, a memory device capable of storing data of a plurality of sound patterns, a selecting device enabling to select a desired sound pattern data from the data of the plurality of sound patterns stored in the memory device, and a sound generating device capable of generating a sound based on the selected sound pattern data when the charging operation of the battery by the charging device has been completed.

The sound pattern selecting device enables selection of a desired sound pattern data from the data of a plurality of sound patterns. Therefore, in the event that a plurality of same or similar types of charging systems are used in the work cite, it is possible to select a sound pattern data for a particular charging system, which is different from selected sound pattern data for the other charging systems. Thus, when the charging operation has been completed, such a particular charging system generates a sound that is different from sounds that are generated by the other charging systems. Therefore, the operator can clearly recognize when the charging operation by the particular charging system has been completed.

In this specification, the language "sound pattern" is used to mean every kind of sounds, such as a melody sound, a voice sound, a buzzer sound and a sound of siren.

In one embodiment, the charging device starts the charging operation when a predetermined time has passed after the battery side connector and the charger side connector have been connected. The selecting device replaces the selected sound pattern data with the next sound pattern data stored in the memory device when the battery side connector and the charger side connector have been reconnected to each other after the battery side connector and the charger side connector were disconnected from each other.

With this arrangement, it is possible to age the selected sound pattern to the next sound pattern by disconnecting and reconnecting the connectors. Repeating the operation of disconnecting and reconnecting the connectors sequentially change the selected sound pattern to the subsequent sound patterns. Because no switch is required for changing the selected sound pattern, the manufacturing cost can be reduced.

In another embodiment, the sound generating device is also capable of generating the sound based on the selected sound pattern data during the selecting operation by the selecting device. A volume of the sound generated during the selecting operation is smaller than a volume of the sound generated when the charging operation of the battery by the charging device has been completed.

With this arrangement, it is possible to select the sound pattern while the operator listens to the selected sound pattern. Therefore, the sound selecting operation can be reliably performed.

In a further embodiment, the sound generating device includes a sound generating element that can generate a sound when a voltage is applied; so that a volume of the sound generated by the sound generating element can be varied in response to change of the voltage.

In a still further embodiment, the sound pattern memory device is configured such that sound pattern data from a personal computer can be written into the sound pattern memory device. With this arrangement, downloading sound patterns into the personal computer through internet enables the operator to select his or her favorite sound pattern or generation by the sound generating device. Therefore, the charging system that he or she is using can be clearly distinguished from the other charging systems.

In a still further embodiment, the system further includes a lighting device including a light emitter that can emit light when the battery charging operation by the charging device has been completed. Therefore, the completion of the charging operation can be further clearly recognized.

In a still further embodiment, the system further includes a transmitter that can transmit a signal receivable by a communication terminal device when the charging operation by the charging device has been completed. For example, the communication terminal device can be a cellular phone carried by the operator. Therefore, the completion of the charging operation can be recognized even if the operator is away from the work cite.

Another aspect according to the present invention includes a system for charging a battery including a battery charger capable of charging the battery. The battery charger includes a first memory capable of storing sound data groups, a sound generating device capable of generating a sound, and a controller capable of selecting one of the sound data groups and instructing the sound generating device to generate the sound based on the selected sound data group when a charging operation of the battery has been completed.

In one embodiment, the controller is capable of instructing the sound generating device to generate the sound based on the selected sound data group when the sound data group has been selected.

In another embodiment, the system further includes a battery pack constructed to receive the battery, so that the battery is electrically connectable to the battery charger via the battery pack. The battery pack includes a second memory capable of storing the sound data groups. The controller is capable of copying the sound data stored within the second memory to the first memory.

In a further embodiment, the controller is capable of selecting the sound data in response to the operation of electrically disconnecting and reconnecting between the battery charger and the battery.

A further aspect according to the present invention includes a system for charging a battery, which includes a charging device capable of charging a battery; a memory device capable of storing data of a plurality of sound patterns; a selecting device capable of selecting a sound pattern data from the plurality of sound patterns; and a sound generating device capable of generating a sound based on the selected sound pattern data when the charging operation of the battery by the charging device has been completed.

DETAILED DESCRIPTION OF THE INVENTION

Each of the additional features and teachings disclosed above and below may be utilized separately or in conjunction with other features and teachings to provide improved charging systems. Representative examples of the present invention, which examples utilize many of these additional features and teachings both separately and in conjunction with one another, will now be described in detail with reference to the attached drawings. This detailed description is merely intended to teach a person of skill in the art further detail for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Embodiments according to the present invention will now be described with reference to FIGS. 1(A) and 1(B) to FIGS. 6(A) and 6(B).

<Charging System and Battery Pack>

As shown in FIG(A), a charging system 10 can generally include a battery pack 20 and a charger 30. The battery pack 20 is adapted to receive a battery 22 that can serve as a power source of a power tool (not shown). The charger 30 serves to charge the battery 22.

Figure 1:
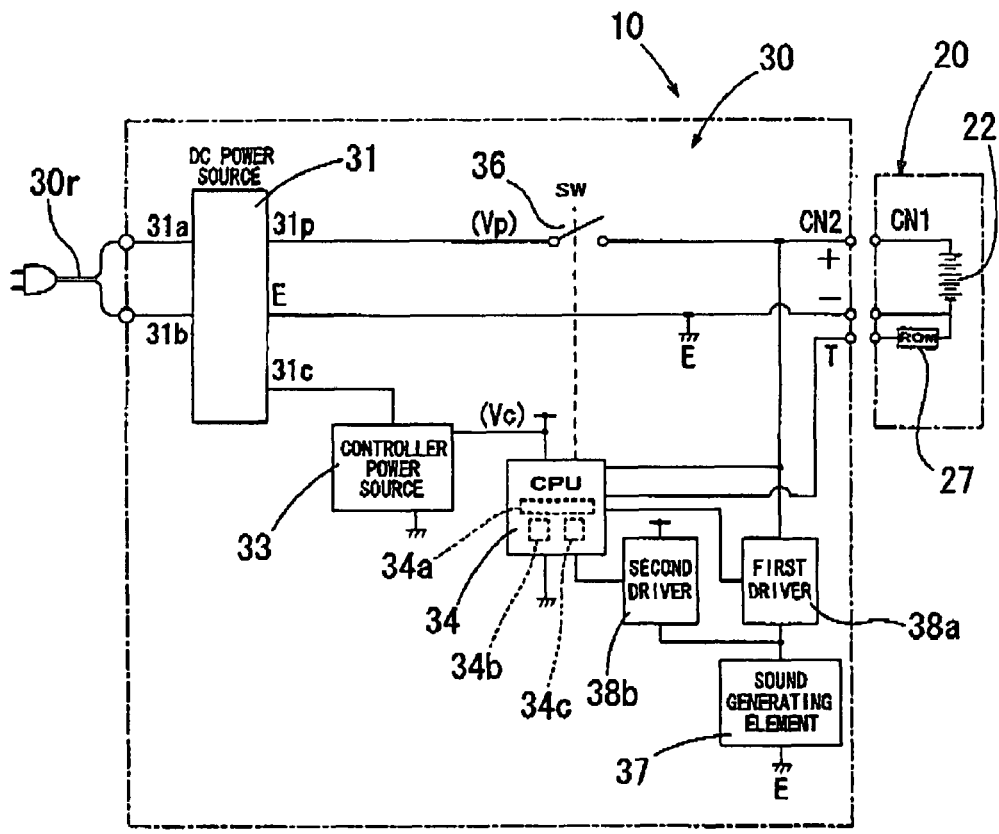
FIG. 1(A) is a diagram showing a circuit configuration of a battery charging system according to an embodiment of the present invention.
FIG. 1(B) is a detailed circuit configuration of a sound generating circuit shown in FIG. 1(A)
Figure 1:
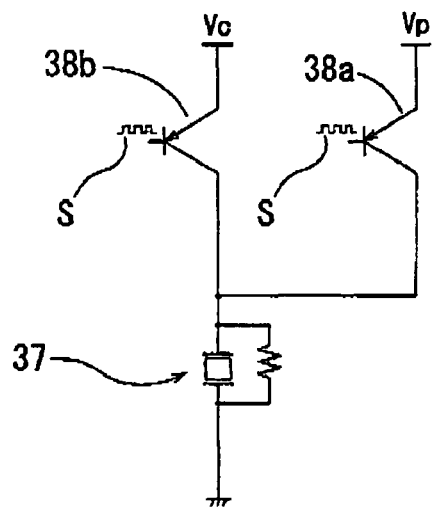
Figure 2:
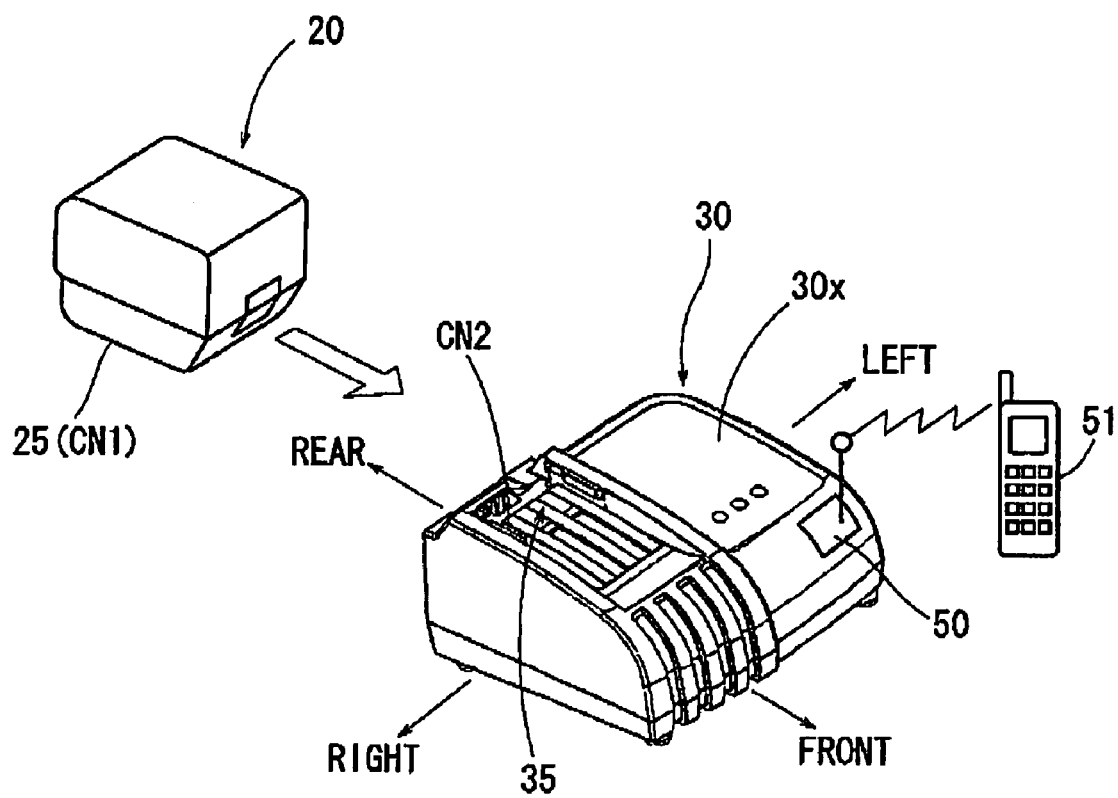
FIG. 2 is a perspective view of a charger and a battery pack of the system.

As shown in FIG. 2, the battery pack 20 can have a substantially prism-like configuration and include a coupler 25 disposed on the upper surface of the battery pack 20. An electrical connector CN1 is provided at a suitable position of the coupler 25 and is electrically connected to the battery 22. The connector CN1 includes terminals connected to positive and negative electrodes of the battery 22 and a communication terminal T that serves as a terminal of a data memory section 27 that will be explained later.

The coupler 25 can be coupled to a corresponding coupler (not shown) provided on the power tool, so that the battery pack 20 can be integrated with the power tool. At the same that the coupler 25 is coupled to the corresponding coupler, the positive and negative terminals of the connector CN1 of the battery pack 20 are electrically connected to the corresponding terminals (not shown) of the power tool so that the power of the battery 22 can be supplied to a motor (not shown) of the power tool.

As show in FIG. 1(A), a data memory section 27 is disposed within the battery pack 20. The data memory section 27 can store data of a variety of sound patters, such as melodies and buzzer sounds. The memory section 27 permits the stored data to be rewritten.

Figure 3:
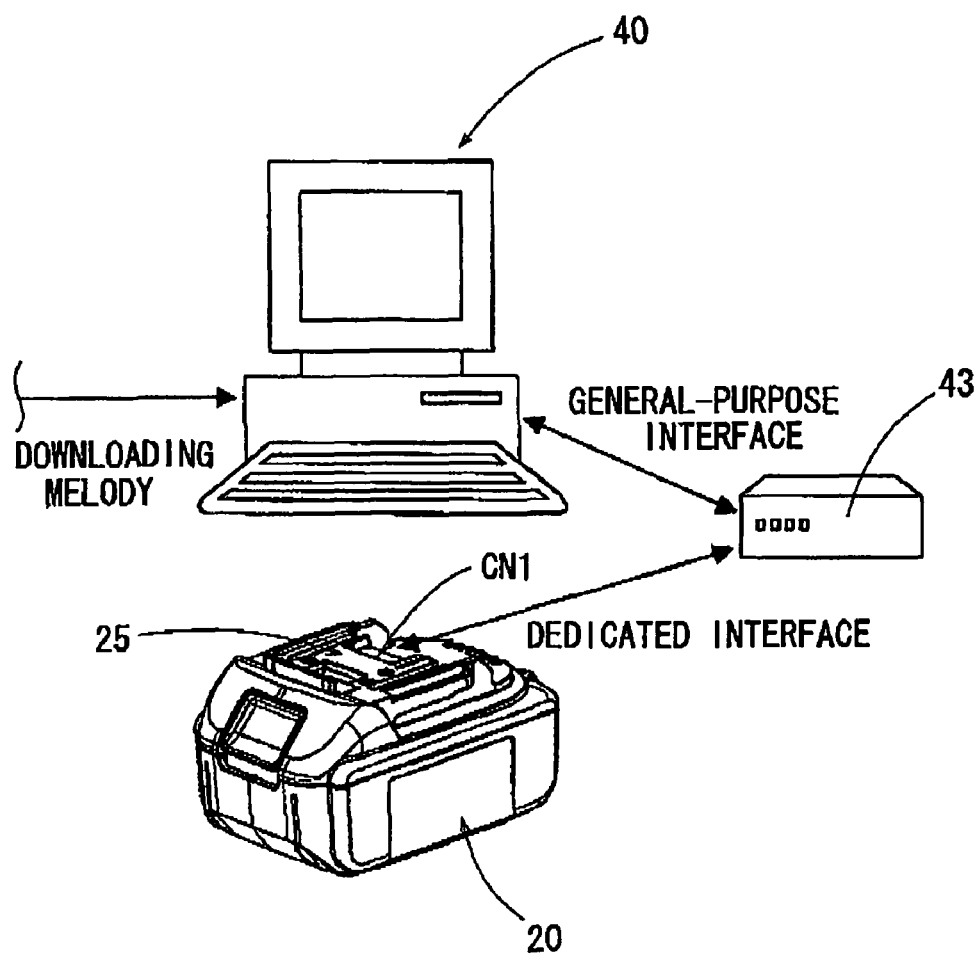
FIG. 3 is a schematic perspective view showing the relation between the battery pack and a personal computers.

Further, as shown in FIG. 3, the connector CN1 can be connected to a data conversion adaptor 43 that can be further connected to a personal computer 40 via a USB connector (not shown). The data conversion adapter 43 serves to connect the data memory section 27 of the battery pack 20 to the personal computer 40 in order to enable transmission of data stored in the personal computer 40 to the data memory section 27. Therefore, it is possible to write the data stored in the personal computer 40 into the data memory section 27 of the battery pack 20. The date stored in the personal computer 40 can include melody data that has been downloaded into the computer 40 via the internet.

<Charger>

As shown in FIG. 2, the charger 30 has a box-like housing 30x. A coupler 35 is disposed on the right side portion of the upper surface of the housing 30x and is adapted to be coupled to the battery pack 20. An electrical connector CN2 is disposed at a suitable position of the coupler 35 and can be electrically connected to the battery pack 20 for charging the battery 22. As shown in FIG. 1(A), similar to the connector CN1 of the battery pack 20, the connector CN2 includes terminals for connecting to the corresponding terminals of the connector CN1 and a communication terminal T1 for connecting to the terminal T.

The coupler 25 of the battery pack 20 can be connected to the coupler 35 of the charger 30 by moving the battery pack 20 from the rear side of the charger 30. More specifically, the coupler 25 can engage the coupler 35 as the battery pack 20 is slidably moved along the upper surface of the charger 30 from the rear side of the charger 30 as shown in FIG. 2. At the same time that the coupler 25 is coupled to the coupler 35, the connector CN1 of the battery pack 20 can be electrically connected to the connector CN2 of the charger 30.

A shown in FIG. 1(A), the charger 30 has a power cord 30r that can be connected to an outlet of a household AC power source. The power cord 30r is electrically connected to input terminals 31a and 31b of a DC power source device 31 of the charger 30. The DC power source device 31 can convert the AC power into a first DC power (Vp volt power) used for a charging purpose and a second DC power (Vc volt power) used for a control purpose.

The first DC power is outputted from first output terminals 31p and E of the power source device 31 and is connected to positive and negative terminals of the connector CN2 via a switch 36 that is controlled by a CPU 34. Here, the first output terminal E is an earth terminal. In this way, the connector CN2 of the charge 30 is connected to the connector CN1 of the battery pack 20, so that the first DC power (Vp power) is supplied to the battery 22 of the battery pack 20 in order to charge the battery 22 when the switch 36 is turned on.

The second DC power of the DC power source device 31 is outputted from second output terminals 31c and E to a controller power source device 33. The controller power source device 33 is used as a constant-voltage supply device for supplying the power to the CPU 34, 37, a sound generating element 37, etc.

The charging operation of the battery 22 can be controlled based on a program stored in a memory 34a of the CPU 34. Also, the CPU 34 is configure to check the charging operation of the battery 22 using the voltage of the battery 22, the temperature of the battery 22, etc. When the CPU 34 determines that the charge to the battery 22 has been completed, the CPU 34 turns off the switch 36, so that the charging operation is terminated.

When the connector CN2 of the charger 30 is connected to the connector CN1 of the battery pack 20, the CPU 34 is connected to the data memory section 27 of the battery pack 20 via the communication terminals T and T1. The CPU 34 also store a program for selecting data from the data of melody (or the like) stored in the data memory section 27 of the battery pack 20 and for selecting data from the data of melody (or the like) stored in the CPU 34. Based on the selected data of melody or the like, the CPU 34 actuates a first driver 38a associated with the sound generating element 37 in order to generate the melody or the like by the sound generating element 37 when the operation for charging the battery 22 has been completed.

The sound generating element 37 may be a piezoelectric buzzer, a piezoelectric speaker or the like. As shown in FIGS. 1(A) and 1(B), the sound generating element 37 generates sounds by the actuation of the first driver 38a or a second driver 38b. Each of the first and second drivers 38a and 38b is a switching element, such as a transistor, and is actuated by a signal S from the CPU 34. As shown in FIG. 1(B), a power source terminal of the first driver 38a is connected to the positive terminal of the connector CN2, so that a battery voltage Vp is applied to the power source terminal of the first driver 38a. A power source terminal of the second driver 38b is connected to the controller power source device 33, so that a voltage Vc is applied to the power source terminal of the second driver 38b. Here, the voltage Vc is set to be smaller than the voltage Vp. Therefore, when the first driver 38a is actuated, the voltage Vp is applied to the sound generating element 37, so that a large volume sound is produced. On the other hand, when the first driver 38b is actuated the voltage Vc is applied to the sound generating element 37, so that a small volume sound is produced.

Figure 5:
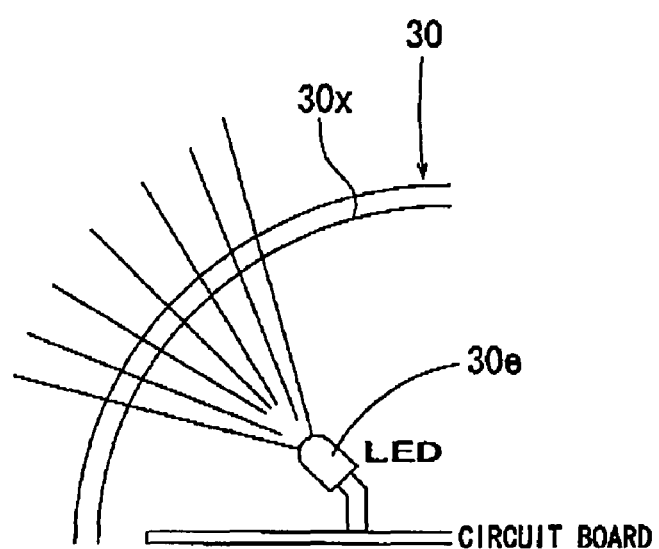
FIG. 5 is a schematic view of a lighting device.
Figure 6A:
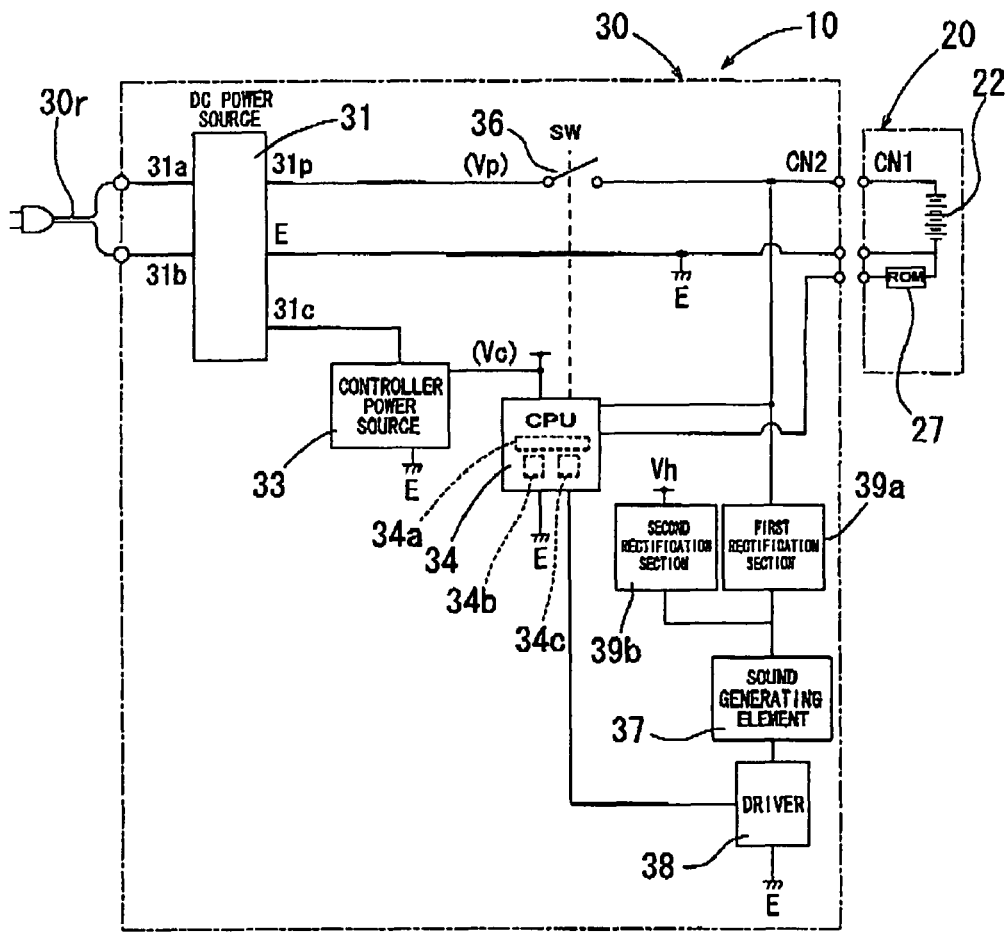
FIG. 6(A) is a diagram showing a circuit configuration of a battery charging system according to an alternative embodiment.
Figure 6B:
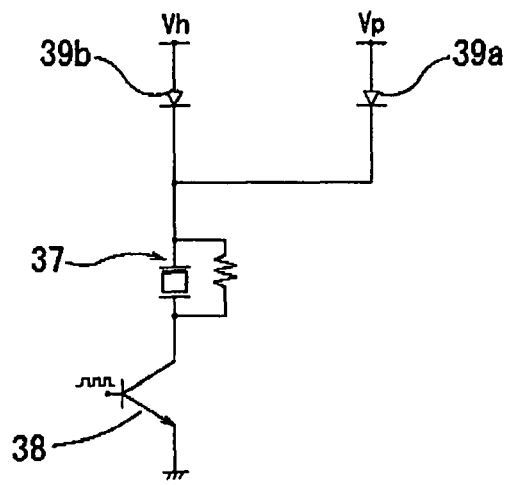
FIG. 6(B) is detailed circuit configuration of a sound generating circuit shown in FIG. 6(A).

Further, as shown in FIG. 5, an LED 30e can be mounted to a circuit board to which the CPU is mounted. The LED 30e is actuated by a signal that is outputted from the CPU 34 when the charging operation has been completed. The LED 30e is covered by a housing 30x of the charger 30. The housing 30x has a transparent region, so that the light of the LED 30e can be emitted to the outside of the housing 30x of the charger 30 through the transparent region when the charging operation has been completed.

<Operation of Charging System>

Figure 4:
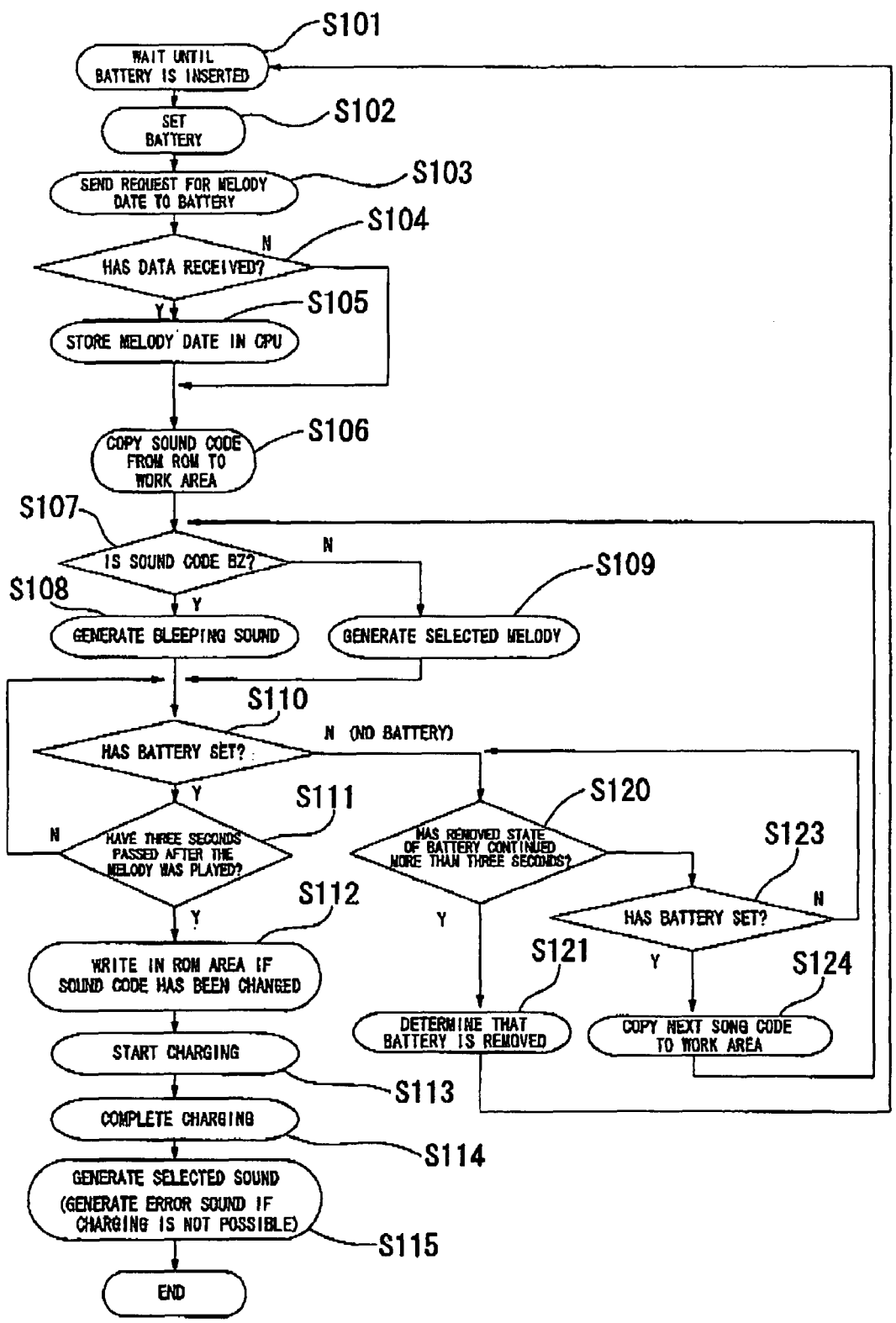
FIG. 4 is a flowchart of showing the operation of the system.

The operation of the charging system 10 will now be described with reference to a flowchart shown in FIG. 4. The process of the flowchart is performed according to a program stored in the memory 34a of the CPU 34.

If the coupler 25 of the battery pack 20 is not coupled to the couple 35 of the charger 30, (i.e., if the connector CN2 of the charger 30 is not electrically connected to the connector CN1 of the battery pack 20), the switch 36 is held in an off position as shown in FIG. 1(A) (see Step S101). Thus, the switch 36 is held in the off position unless the battery 22 is set to the charger 30 so as to be electrically connected to the charger 30. The determination as to whether or not the battery 22 is set can be made, for example, by monitoring the voltage at the positive terminal of the connector CN2 by the CPU 34. Thus, if the voltage value at the positive terminal of the connector CN2 is zero, the CPU 34 determines that the positive terminal of the connector CN2 is not electrically connected to the battery 22, and therefore, the battery 22 is not set. Alternatively, it is possible to determine that the battery 22 is not set if a sensor or other suitable detector detects that the CPU 34 is not connected to the data memory section 27 of the battery pack 20.

If the battery 20 has been set to the charger 30 in Step S102, the process then proceeds to Step S103 in which the CPU 34 sends a request for melody data to the data memory section 27 of the battery pack 20. Then, the process proceeds to Step S104 in which the CPU 34 determines whether or not the melody data is stored in the data memory section 27. If the determination in Step S104 is "YES", the process proceeds to Step S105 in which the stored melody data is copied to a data memory section 34c of the CPU 34. Then, the process proceeds to Step S106 in which a first sound code of the melody data or other sound data is copied from the data memory section 34a of the CPU 34 to a work area 34c of the CPU 34. The process further proceeds to Step S107 in which the CPU 34 determine if the copied first sound code designates a buzzer sound. If the determination is "YES", the process proceeds to Step S108 in which the CPU 34 outputs a buzzer sound signal to the second driver 38b, so that the sound generating element 37 generates a buzzer or beeping sound. This buzzer or beeping sound is small because the voltage Vc is applied to the second driver 38b.

If the first sound code copied to the work area 34c does not designate a buzzer or beeping sound but designates a melody, determination "NO" is resulted in Step S107. Then, the process proceeds to Step S109 in which the CPU 34 outputs a melody signal corresponding to the copied first sound code to the second driver 38b, so that the sound generating element 37 generates a melody sound designated by the first sound code.

From Step S108 and S109, the process proceeds to Step S110 in which the CPU 34 determines if the battery 22 is set to the charger 30. If the operator wishes to change the buzzer (or beeping) sound or the melody sound to a different melody sound, the operator can disconnect the connector CN1 of the battery pack 20 from the connector CN2 of the charger 30 within three seconds after generation of the buzzer (or beeping) sound or the melody sound. Then, determination "NO" is resulted in Step S110 and the process proceeds to Step S120 in which the CPU 34 determines if the disconnected state has continued more than three seconds. If the operator reconnects the connector CN1 to the connector CN2 within three seconds after the connector CN1 has been disconnected from the connector CN2, determination "NO" is resulted in Step S120 and the process proceeds to Step S123. Because the determination in Step S123 is "YES", the process further proceeds to Step S124 where a next sound code of the stored data is copied to the work area 34c. Thereafter, the process returns to Step S107 in which the CPU 34 determines if the copied sound code designates a buzzer sound. As described previously, if the determination is "YES", the process proceeds to Step S108 in which the CPU 34 outputs a buzzer sound signal to the second driver 38b, so that the sound generating element 37 generates a buzzer or beeping sound. If the determination in Step S107 is "NO", the process proceeds to Step S109 in which the sound generating element 37 receives a melody signal and generates a melody sound designated by the copied second sound code.

If the operator wishes to again change the melody sound, the operator can again disconnect the connector CN1 from the connector CN2 and thereafter reconnects the connector CN1 to the connector CN2 in order to repeat the process of Steps S110-S120-S123-S124 and Steps S107-S108-S109-S110.

If the connector CN1 has been disconnected from the connector CN2 more than three seconds, determination "YES" results in Step S120. Then, the CPU 34 determines that the battery 22 is removed in Step S121 and the process returns to Step S101 in order to wait until the battery 22 is set.

Further, if the operator does not wish to change the melody sound generated in Step S109, the operator is not required to take any action. Thus, the process proceeds to Step S111 in which the CPU 34 determines if three seconds has passed after the melody sound has been generated. If the determination in Step S111 is "YES", the step proceeds to Step S112 in which the sound code of the lastly generated melody sound is written as a fist sound code. Then, the generation of the melody sound is stopped.

In this way, the sound to be generated is selected by the process of Steps S110-S120-S123-S124 and Steps S107-S108-S109-S110 performed by the program stored in the CPU 34. The CPU 34 of the charger 30 serves to store various sound patters or types, from which the sound to be generated is selected.

After completion of selection of the sound to be generated, the CPU 34 sends a signal to the switch 36 in order to turn on the switch 36. Then, the voltage of the first DC power from the DC power source device 31 is applied to the battery 22 of the battery pack 20. Thus, the charging of the battery 22 is started in Step S113. When the charging operation has been completed, the CPU sends a signal to turn off the switch 36 in Step S114. The process then proceeds to Step S116 in which the CPU sends a signal corresponding to the selected sound to the first driver 38a, so that the sound generating element 37 generates the selected sound in Step S115. Because the first driver 38a applies the voltage Vp supplied from the battery 22, the sound generating element 37 generates a large sound. Simultaneously with the generation of the sound, the CPU 34 can send a signal to the LED 30e, so that the LED 30e emits the light.

Therefore, in this embodiment, the DC power source device 31 supplying the first DC power, the CPU, and the witch 36, serve as a charge control device. The first driver 38a and the sound generating element 37 serve as a sound generation device for generating the sound when the charging operation has been completed. The CPU 34 and the LED 30e serve as a lighting device.

<Advantages of Charging System>

With the charging system 10 according to the embodiment, by virtue of the sound selecting function of the CPU 34, it is possible to select a desired sound from various sounds that are different in pattern or type and include various melody sounds and/or a buzzer (or beeping) sound. Therefore, even in the event that several charging systems are used at the same work cite, the selection of the sound enables the operator to easily reliably recognize the completion of the charging operation by a particular charging system. In addition, by selecting different sounds for different charging systems, it is possible to easily recognize which charging system has completed the charging operation.

In addition, by repeatedly performing the operation of disconnecting the connector CN1 on the battery side from the connector CN2 on the charger side and subsequently reconnecting the connector CN1 to the connector CN2 before the charging operation is started, it is possible to sequentially select the sound from several sounds that are stored in the data memory section 27 of the battery pack 20 in addition to the sounds previously stored in the data memory section 34b of the CPU 34. Therefore, it is not necessary to provide an additional switch for selecting the sound. As a result, the manufacturing cost can be reduced.

Further, during the selection of the sound, the sound generating element 27 generates the selected sound at a volume smaller than the volume of the selected sound that will be produced when the charging operation has been completed. This enables the operator to select the sound while he or she listens to the sound that is being selected. Therefore, the selection of the sound can be efficiently and reliably performed.

Furthermore, the sound data can be written into the data memory section 27 of the battery pack 20 from the personal computer 40. Therefore, for example, if the operator downloads his or her favorite melody, music or any other sounds into the computer 40, the operator can select such a sound for generation by the sound generating element 27. Therefore, the operator can more clearly distinguish his or her charging system from other charging systems.

Still furthermore, the completion of the charging operation of the battery 22 can be easy visually recognized because the LED 30e emits light when the charging operation has been completed.

The present invention may not be limited to the above embodiment. Thus, the above embodiment may be modified in various ways without departing from the spirit of the invention. For example, the following modification can be made:

In the above embodiment, the first driver 38a and the second driver 38b shown in FIG. 1(A) were used in order to change the voltage applied to the sound generating element 37 between the state where the sound is being selected an the state where the charging operation has been completed. Alternatively, it is possible to use the configuration shown in FIGS. 6(A) and 6(B). In the configuration shown in FIGS. 6(A) and 6(B), the voltage Vp from the battery 22 is supplied to a first rectifier 39a. A voltage Vh from another power source (not shown) is higher than the control voltage Vc and is supplied to a second rectifier 39b. The output side of each of the first rectifier 39a and the second rectifier 39b is connected to the sound generating element 37. In addition, a driver 38 is connected in series between the sound generating element 37 and the earth. With this arrangement, it is possible that one of the voltage Vp or the voltage Vh having a higher value than the other is applied to the sound generating element 37, so that it is possible to generate a sound as large as possible during the selection of the sound and when the charging operation has been completed.

In the above embodiment, the light can be emitted from the LED 30e simultaneously with generation of the sound when the charging operation has been completed. However, in place of or in addition to the LED 30e, it is possible to provide a transmitter 50 or transmitting a charge completion signal that can be received by a cellular phone 51 or other remote receiver (see FIG. 2). Therefore, the operator can recognize the completion of the charging operation even if he or she is away from the work cite.

In the above embodiment, the sound is selected by performing the operation of disconnecting the connector CN1 on the battery side from the connector CN2 on the charger side and subsequently reconnecting the connector CN1 to the connector CN2. However, a switch can be incorporated in order to select the sound.

This invention claims:

1. A system for charging a power tool battery, comprising:
   a battery side connector and a charger side connector electrically connected to each other;
   a charging device that charges the battery when the battery side connector and the charger side connector are electrically connected, the charging device comprising:
      a memory device that stores data of a plurality of sound patterns;
      a selecting device that selects a sound pattern data from the data of the plurality of sound patterns stored in the memory device; and
      a sound generating device that generates a sound based on the selected sound pattern data when the charging operation of the battery by the charging device is completed,
   wherein the sound pattern data includes at least a first sound pattern data and a second sound pattern data,
   the selecting device selects the first sound pattern data when the battery side connector and the charger side connector are connected to each other, and
   the selecting device changes the first sound pattern data to the second sound pattern data when the battery side connector and the charger side connector are disconnected and reconnected to each other after selection of the first sound pattern data, regardless of a charging state of the battery.

2. The system as in claim 1, wherein:
   the charging device starts the charging operation when a predetermined time has passed after the battery side connector and the charger side connector are connected.

3. The system as in claim 1, wherein:
   the sound generating device generates the sound based on the selected sound pattern data during the selecting operation by the selecting device.

4. The system as in claim 3, wherein a volume of the sound generated during the selecting operation is smaller than a volume of the sound generated when the charging operation of the battery by the charging device is completed.

5. The system as in claim 1, wherein:
   the sound generating device comprises a sound generating element that can generate a sound when a voltage is applied.

6. The system as in claim 5, wherein a volume of the sound generated by the sound generating element is varied in response to a change of the voltage.

7. The system as in claim 1, wherein the sound pattern memory device is configured such that sound pattern data from a personal computer is written into the sound pattern memory device.

8. The system as in claim 1, further comprising a lighting device including a light emitter that emits light when the battery charging operation by the charging device is completed.

9. The system as in claim 1, further comprising a transmitter that transmits a signal to a communication terminal device when the charging operation by the charging device is completed.

10. A system for charging a battery comprising:
    a battery charger that charges the battery, the battery charger comprising:
       a first memory that stores sound data groups;
       a sound generating device that generates a sound; and
       a controller that selects one of the sound data groups and instructs the sound generating device to generate the sound based on the selected sound data group when a charging operation of the battery is completed; and
    a battery pack constructed to receive the battery, so that the battery is electrically connected to the battery charger via the battery pack,
    wherein the battery pack includes a second memory that stores the sound data groups, and
    the controller copies the sound data stored in the second memory to the first memory and selects the sound data in response to the operation of electrically disconnecting and reconnecting between the battery charger and the battery, regardless of a charging state of the battery.

11. The system as in claim 10, wherein the controller instructs the sound generating device to generate the sound based on the selected sound data group when the sound data group is selected.

12. A system for charging a battery comprising:
    a charging device that charges a battery, the charging device comprising:
       a memory device that stores data of a plurality of sound patterns;
       a selecting device that selects a sound pattern data from the plurality of sound patterns; and
       a sound generating device that generates a sound based on the selected sound pattern data when the charging operation of the battery by the charging device is completed,
    wherein the sound pattern data includes at least a first sound pattern data and a second sound pattern data,
    the selecting device selects the first sound pattern when the battery side connector and the charger side connector are connected to each other, and
    the selecting device changes the first sound pattern data to the second sound pattern data when the battery side connector and the charger side connector are disconnected and reconnected to each other after selection of the first sound pattern data, regardless of the charging state of the battery.

13. The system as in claim 12, further including a battery side connector and a charger side connector electrically connected to each other, wherein the charging device starts the charging operation when a predetermined time has passed after the battery side connector and the charger side connector are connected.

14. The system as in claim 12, wherein the memory device is configured to receive sound pattern data from a personal computer.

15. The system as in claim 12, further comprising a lighting device that emits light when the battery charging operation is completed.

16. The system as in claim 12, further comprising a transmitter that transmits a signal to a communication terminal device when the charging operation by the charging device is completed.

* * * * *